United States Patent
Ying et al.

(10) Patent No.: US 11,057,297 B2
(45) Date of Patent: Jul. 6, 2021

(54) METHOD, DEVICE AND COMPUTER PROGRAM PRODUCT FOR PATH OPTIMIZATION

(71) Applicant: EMC IP Holding Company LLC, Hopkinton, MA (US)

(72) Inventors: Zhi Ying, Shanghai (CN); Kun Wang, Beijing (CN); Pengfei Wu, Shanghai (CN); Jinpeng Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 16/537,117

(22) Filed: Aug. 9, 2019

(65) Prior Publication Data

US 2020/0344154 A1   Oct. 29, 2020

(30) Foreign Application Priority Data

Apr. 25, 2019 (CN) .......................... 201910337917.3

(51) Int. Cl.
*H04L 12/725* (2013.01)
*H04L 12/727* (2013.01)
(Continued)

(52) U.S. Cl.
CPC ........ *H04L 45/302* (2013.01); *H04L 43/0864* (2013.01); *H04L 43/16* (2013.01); *H04L 45/121* (2013.01); *H04L 45/122* (2013.01)

(58) Field of Classification Search
CPC ... H04L 45/302; H04L 43/0864; H04L 43/16; H04L 45/121; H04L 45/122; H04L 45/22; H04L 41/5009; H04W 40/02
See application file for complete search history.

(56) References Cited

U.S. PATENT DOCUMENTS

| | | | |
|---|---|---|---|
| 2005/0286426 A1* | 12/2005 | Padhye ................ | H04L 45/124 370/238 |
| 2011/0075578 A1* | 3/2011 | Kim ..................... | H04W 40/16 370/252 |

(Continued)

OTHER PUBLICATIONS

Wikipedia Contributors, "Service-Level Objective," Wikipedia, The Free Encyclopedia, https://en.wikipedia.org/w/index.php?title=Service-level_objective&oldid=907292443, accessed Aug. 9, 2019, 3 pages.

(Continued)

*Primary Examiner* — Shukri Taha
(74) *Attorney, Agent, or Firm* — Ryan, Mason & Lewis, LLP

(57) ABSTRACT

A method for path optimization comprises: obtaining, at an edge node of a network including a plurality of nodes, locations and performances of one or more nodes from among the plurality of nodes in the network; determining performance indices associated with the one or more nodes based on the locations and the performances of the one or more nodes and a service level objective (SLO), a performance index indicating a difference between a performance of a respective node and the SLO; and determining, based on the locations of the one or more nodes and the performance indices, a target path for delivering a packet from the edge node to a destination node. Advantageously, the path for transmitting the packet flow is optimized in real time according to dynamic changes in the network environment, so that an end-to-end service level objective is met as much as possible.

20 Claims, 8 Drawing Sheets

(51) Int. Cl.
*H04L 12/26* (2006.01)
*H04L 12/733* (2013.01)

(56) References Cited

U.S. PATENT DOCUMENTS

| | | | |
|---|---|---|---|
| 2012/0233308 A1* | 9/2012 | Van De Houten | H04L 43/10 709/224 |
| 2017/0126476 A1* | 5/2017 | Curtin | H04L 41/5009 |
| 2017/0181013 A1* | 6/2017 | Toka | H04L 41/5009 |
| 2019/0036816 A1* | 1/2019 | Evans | H04L 43/04 |

OTHER PUBLICATIONS

Wikipedia Contributors, "Quality of Service," Wikipedia, The Free Encyclopedia, https://en.wikipedia.org/w/index.php?title=Quality_of_service&oldid=905475099, accessed Aug. 9, 2019, 10 pages.

Wikipedia Contributors, "Resource Reservation Protocol," Wikipedia, The Free Encyclopedia, https://en.wikipedia.org/w/index.php?title=Resource_Reservation_Protocol&oldid=882465243, accessed Aug. 9, 2019, 4 pages.

Wikipedia Contributors, "Software-Defined Networking," Wikipedia, The Free Encyclopedia, https://en.wikipedia.org/w/index.php?title=Software-defined_networking&oldid=909766421, accessed Aug. 9, 2019, 11 pages.

\* cited by examiner

```
SLOs:
    30.1
State:
    state: 100 total_rtl: 0
Final Episode:
    state: (152, 0) action: 3 tc: 2 reward: -50.0
    state: (144, 0) action: 5 tc: 2 reward: -100.0
    state: (172, 0) action: 5 tc: 0 reward: -110.0
    state: (173, 0) action: 3 tc: 0 reward: -120.0
    state: (129, 0) action: 0 tc: 0 reward: -130.0
    state: (123, 0) action: 0 tc: 2 reward: -180.0
    state: (133, 0) action: 2 tc: 2 reward: -230.0
    state: (180, 0) action: 5 tc: 1 reward: -260.0
    state: (199, 0) action: 2 tc: 1 reward: -519.9
```

FIG. 6

METHOD, DEVICE AND COMPUTER PROGRAM PRODUCT FOR PATH OPTIMIZATION

RELATED APPLICATION(S)

The present application claims priority to Chinese Patent Application No. 201910337917.3, filed Apr. 25, 2019, and entitled "Method, Device and Computer Program Product for Path Optimization," which is incorporated by reference herein in its entirety.

FIELD

Embodiments of the present disclosure generally relate to the field of computer networks, and specifically to a method, a device and a computer program product for path optimization.

BACKGROUND

In traditional network architectures, technologies such as routing protocols, quality of service (QoS), resource reservation protocol (RSVP), software-defined networks (SDN) are generally employed when a problem about how to forward a packet from a source to a destination is considered. For example, in most cases involving routing protocols, a router makes a routing decision on a next hop based on a best-effort strategy, which means that the router will simply forward the packet to a router that claims to be the closest to the destination. However, the best-effort strategy is not necessarily suitable for all types of network flow, so network performance is not guaranteed. QoS-related technologies include flow classification, queuing and shaping methods, policy control methods, and the like. These technologies are statically configured on network devices based on marks or flow information of packets. In general, these technologies do not support application awareness and lack a whole picture of packet flow.

RSVP is a transport layer protocol unidirectionally configured by a receiver of a flow, and meanwhile it is also a statically-configured routing method and lacks awareness capability to terminal applications. Therefore, the RSVP cannot dynamically adjust a network behavior according to flow type during transmission. The SDN is a controller-based network architecture. In an SDN architecture, although a controller may dynamically monitor and manage a network, the controller also becomes a bottleneck of the entire network because of the following reasons: 1) each controller can only handle a limited number of network nodes and traffic flows, which greatly limits network scale; 2) when the controller fails, it will cause shut down of the entire site; and 3) the network fully trusts the controller, so that an edge node in the network cannot adjust a network behavior according to their needs.

SUMMARY

Embodiments of the present disclosure provide a method, a device and a computer program product for path optimization.

According to a first aspect of the present disclosure, there is provided a method for path optimization. The method comprises: obtaining, at an edge node of a network including a plurality of nodes, locations and performances of one or more nodes from among the plurality of nodes in the network; determining performance indices associated with the one or more nodes based on the locations and the performances of the one or more nodes and a service level objective (SLO), a performance index indicating a difference between a performance of a respective node and the SLO; and determining, based on the locations of the one or more nodes and the performance indices, a target path for delivering a packet from the edge node to a destination node.

According to a second aspect of the present disclosure, there is provided an electronic device. The device comprises: at least one processing unit; at least one memory coupled to the at least one processing unit and storing instructions executable by the at least one processing unit. The instructions, when executed by the at least one processing unit, cause the device to perform acts comprising: obtaining, at an edge node of a network including a plurality of nodes, locations and performances of one or more nodes from among the plurality of nodes in the network; determining performance indices associated with the one or more nodes based on the locations and the performances of the one or more nodes and a service level objective (SLO), a performance index indicating a difference between a performance of a respective node and the SLO; and determining, based on the locations of the one or more nodes and the performance indices, a target path for delivering a packet from the edge node to a destination node.

According to a third aspect of the present disclosure, there is provided a computer program product that is tangibly stored in a non-transitory computer storage medium and comprises machine-executable instructions. The machine-executable instructions which, when executed by a device, causing the device to perform the method described according to the first aspect of the present disclosure.

This Summary is provided to introduce a selection of concepts that are further described below in the Detailed Description. This Summary is not necessarily intended to identify each and every key feature or essential feature of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

FIG. 6 shows a schematic diagram of a verification test of a learning model for path optimization in accordance with an embodiment of the present disclosure;

DETAILED DESCRIPTION

Figure 1:
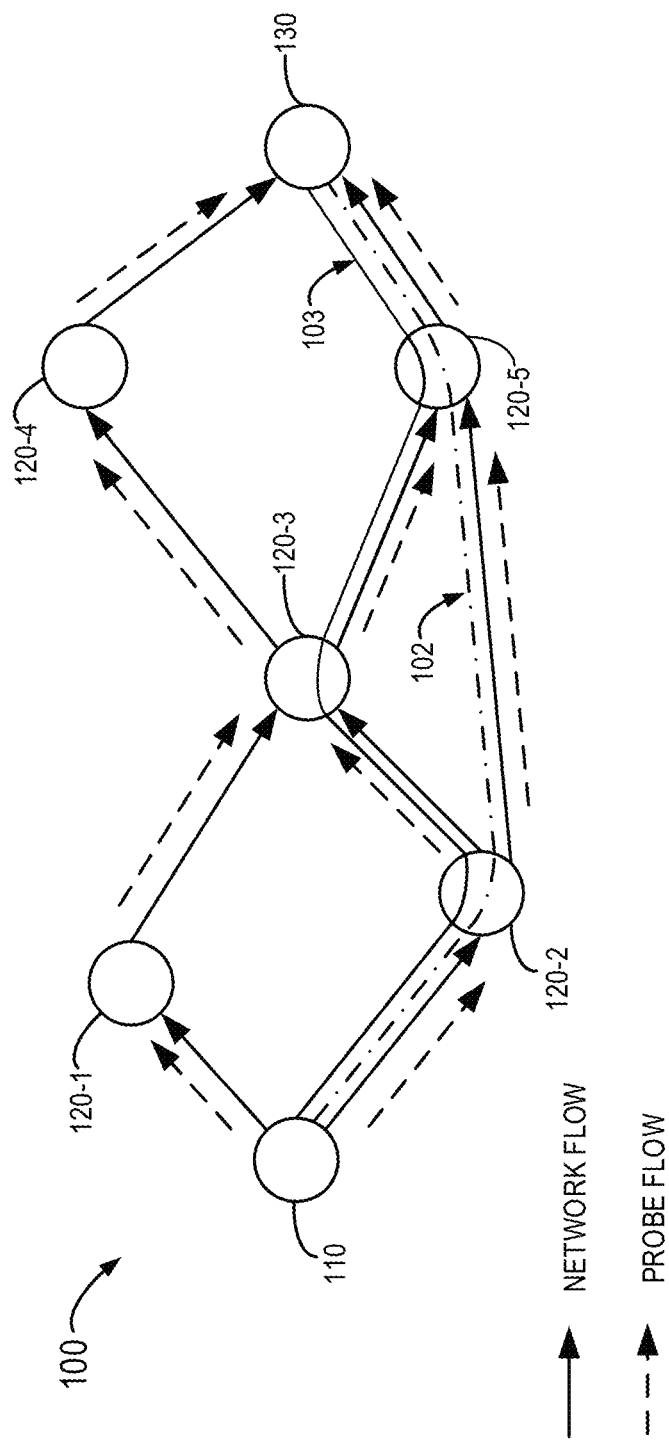
FIG. 1 shows a schematic diagram of an example network in which embodiments of the present disclosure may be implemented.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one embodiment" and "one embodiment" are to be read as "at least one embodiment." The term "another embodiment" is to be read as "at least one other embodiment." The terms "a first", "a second" and others may denote different or identical objects. The following text may also contain other explicit or implicit definitions.

As mentioned above, routing technologies commonly used in traditional network architectures are insufficient to meet requirements of next-generation network interconnect architectures. The present disclosure realizes that the next generation network should have at least the following attributes:

1) End-to-end service level objective (SLO): from terminal user and application point of view, end-to-end network performance such as SLO is the most important consideration. On the other hand, performance between intermediate nodes is not as important to them.

2) Application awareness capability: nowadays applications such as HyperText Transfer Protocol (HTTP) flow are complicated, many different applications and webpages are running at a same port. As a result, using a port number and Internet Protocol (IP) address to differentiate flow types is not enough. Meanwhile, different applications have different network requirements and SLOs. For example, some applications are latency sensitive and some are bandwidth sensitive. Hence, the network should have a capability of treating these applications differently, namely, have an application awareness capability.

3) Dynamic intelligence: the network should learn from a network environment changing over time and deal with an uncertain network environment by using artificial intelligence technologies.

4) Decentralized: as mentioned above, for a controller-based network architecture such as SDN, its controller has become a bottleneck of the entire network, thus it is beneficial to use a decentralized architecture to solve problems such as a controller performance bottleneck and single point of failure that a centralized architecture such as SDN exhibits.

In order to implement the above attributes and to catch up with constantly evolving technologies and requirements, exemplary embodiments of the present disclosure propose a dynamic intelligent decentralized network architecture that enables quantification of an expectation for service execution within a given time period from a perspective of a terminal user and an application, to meet an application-level end-to-end SLO as much as possible. In addition, the network architecture proposed in accordance with embodiments of the present disclosure also has an application awareness capability.

FIG. 1 illustrates a block diagram of an example network 100 in which embodiments of the present disclosure may be implemented. As shown in FIG. 1, the network 100 includes a plurality of nodes 110, 120-1 through 120-5, and 130, wherein the node 110 is an edge node, the node 130 is a destination node, and nodes 120-1 through 120-5 are intermediate nodes between the edge node 110 and destination node 130.

In the context of the present disclosure, the edge node refers to a network node deployed at or near a terminal user side in a network interconnection architecture, and such network node has better responsiveness and connection speed to a final access user. On the other hand, such network node usually cannot control a processing of network flow.

It should be understood that the structure of the network 100 is described for illustrative purposes only and is not intended to limit the scope of the disclosure. For example, the network 100 may include any number of nodes or any type of nodes, and embodiments of the present disclosure may also be applied to networks that are different from the network 100. In some embodiments, the edge node 110 may be any of end nodes in the network interconnect architecture. In some embodiments, the intermediate nodes between the edge node 110 and the destination node 130 are not limited to the five nodes 120-1 through 120-5 as shown, but may include any suitable number of intermediate nodes.

In an embodiment of the present disclosure, there are network flows as indicated by the solid line in FIG. 1 between respective nodes 110, 120-1 to 120-5 and 130 in the network 100, and a detected flow shown by the dotted line in FIG. 1. In some embodiments, the network flow is generated by an application running at the edge node 110. The detected flow for example may include a probe packet sent by node 110 to other nodes 120-1 through 120-5 and 130 based on a tunneling protocol to obtain locations and performance of nodes 120-1 through 120-5 and 130.

Traditionally, when a packet is to be sent from the edge node 110 to the destination node 130, for example, to forward the network flow generated by an application to the destination node 130, there might be many possible paths. If the shortest path strategy or an optimal best effort strategy is employed, then it may be determined that the shortest path is a path 102 from the edge node 110 to the destination node 130 via the nodes 120-2 and 120-5. This means that network flow generated by all applications running at the edge node 110 will be forwarded to the destination node 130 via the path 102.

However, as mentioned above, different applications running simultaneously at the edge node 110 may have different network requirements and SLOs, respectively. Therefore, it is not appropriate to use a same routing strategy for different types of packets generated by these applications. The following scenario is considered: it is assumed that a link from the node 120-2 directly to the node 120-5 has a high latency, while a link from the node 120-2 via the node 120-3 to the node 120-5 has a low latency. If a packet generated by a latency-sensitive application is to be sent, i.e., the SLO of interest is low latency, it is obviously more favorable for such packet to be sent along a path 103 from the node 110 via the nodes 120-2, 120-3, 120-5 to the node 130, as compared with the shortest path 102.

Embodiments of the present disclosure provide a solution for path optimization to solve one or more of the above problems and other potential problems. The solution can decentralize a central decision-making power of path optimization to an edge node side, and implement a dynamic intelligent routing strategy to meet needs of many applications running at edge nodes and the network flow generated by them for different SLOs and network performance.

Figure 2:
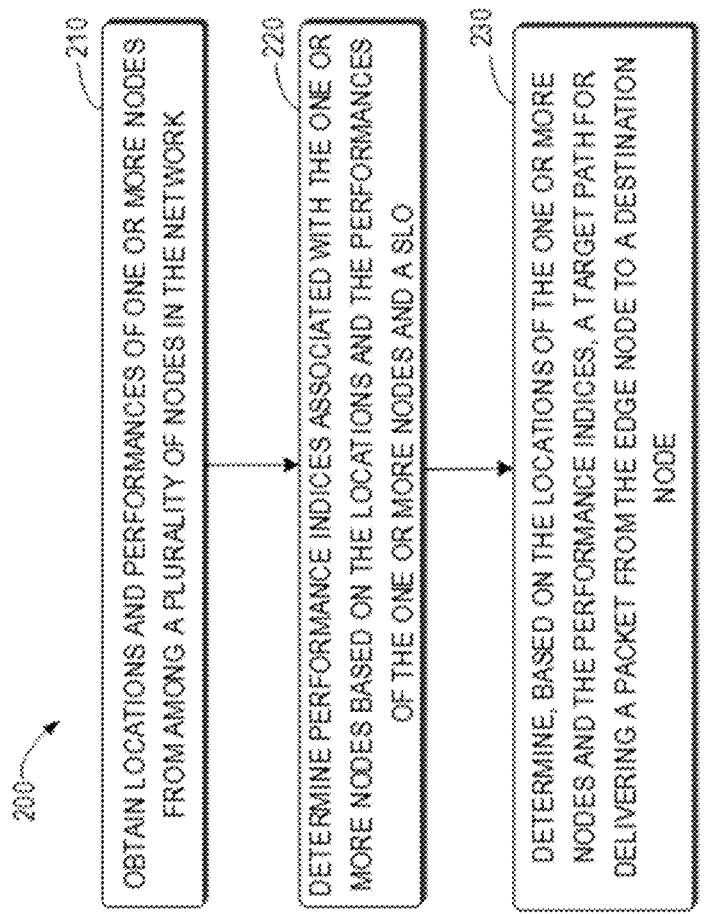
FIG. 2 shows a flow chart of a method for path optimization in accordance with an embodiment of the present disclosure.

FIG. 2 illustrates a flow diagram of a method 200 for path optimization in accordance with an embodiment of the present disclosure. For example, the method 200 may be performed at the edge node 110 as shown in FIG. 1. It should be understood that the method 200 may also include additional actions not shown and/or may omit the shown actions, and the scope of the present disclosure is not limited in this respect. The method 200 is described below in conjunction with the network shown in FIG. 1.

At block 210, the edge node 110 obtains locations and performances of one or more nodes from among a plurality of nodes in the network.

In some embodiments, the edge node 110 may obtain locations and performances of nodes 120-1 through 120-5 and the destination node 130 in the network 100. As an example, a location of a node includes a physical location and a logical location of the node in a network topology. The performance of a node may include, but is not limited to, the node's current minimum bandwidth, response time, round-trip latency, failure time, failure frequency, reliability, repair time, memory occupation, queue length, accuracy, integrity, throughput, etc.

Figure 3:
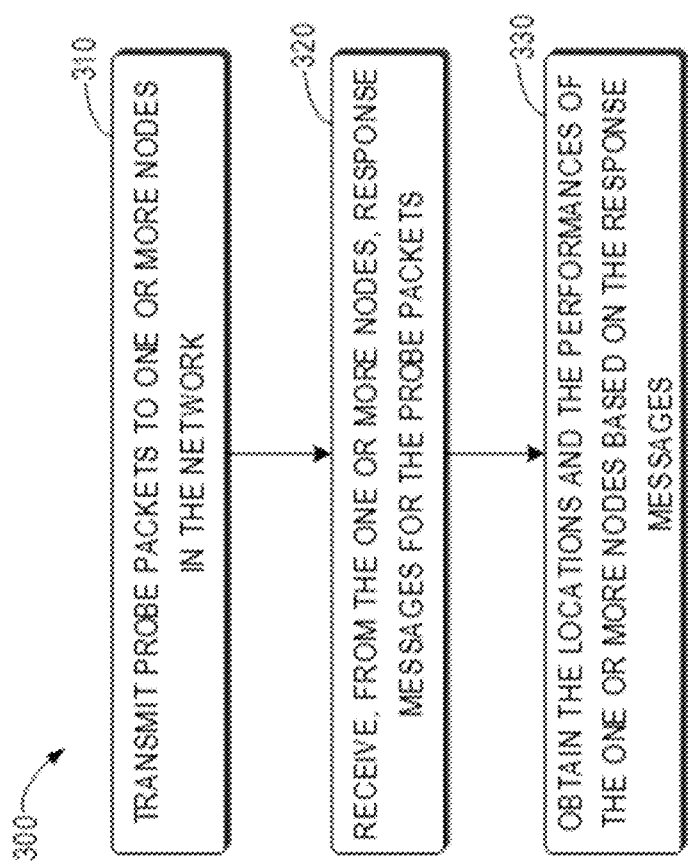
FIG. 3 shows a flow chart of a method for path optimization in accordance with an embodiment of the present disclosure.

FIG. 3 illustrates a flow diagram of an example method 300 for path optimization in accordance with an embodiment of the present disclosure. The method 300 may be regarded as an implementation of the step described in block 210 of FIG. 2, and this implementation is exemplary and not limiting. As shown in FIG. 3, at block 310, the edge node 110 transmits probe packets to one or more nodes in the network, such as the nodes 120-1 through 120-5, and destination node 130.

In some embodiments, the edge node 110 may be deployed with a probe component, the probe component sends probe packets to the nodes 120-1 through 120-5 and 130 in the network 100 to fully detect the entire network 100, and the probe packets may, for example, be probe flows shown by dotted lines in FIG. 1. In some embodiments, source routing technologies such as label-stack tunneling may be used to send the probe packets to specific nodes in the network or to follow a specific path.

At block 320, the edge node 110 receives, from one or more nodes in the network, response messages for the probe packets. For example, the probe component of the edge node 110 receives response messages for the probe packets from the nodes 120-1 through 120-5 and 130 in the network 100, and each response message indicates a location and real-time performance of a corresponding node.

Then, at block 330, the edge node 110 obtains the locations and the performances of the one or more nodes based on the received response messages.

In some embodiments, the edge node 110 may also, in response to the obtained location of a respective node of the one or more nodes being different from a reference location of the respective node, update the reference location of the node with the obtained location.

In such an embodiment, the edge node 110 may be deployed with a storage device configured to store reference locations and reference performances of nodes in the network 100. If the obtained location of the node is different from the reference location of the node stored in the storage device, then the edge node 110 updates, with the obtained location, the reference location of the node stored in the storage device. In other words, when the location of the node in the network does not change, it is unnecessary to update the reference location stored in the storage device. Alternatively, when a new node appears in the network, the reference location of the node may not be stored in the storage device. In such a case, the reference location of the new node will be added and stored in the storage device.

In some embodiments, the edge node 110 may also, in response to the obtained performance of a respective node of the one or more nodes being different from a reference performance of the respective node, update the reference performance of the node with the obtained performance. In such an embodiment, if the obtained performance of the node is different from the reference performance of the node stored in the storage device, then the edge node 110 updates, with the obtained performance, the reference performance of the node stored in the storage device. In other words, when the performance of the node in the network does not change, it is unnecessary to update the corresponding reference performance stored in the storage device. Alternatively, when a new node appears in the network, the reference performance of the node might not be stored in the storage device. In such a case, the reference performance of the new node will be added and stored in the storage device.

In some embodiments, the reference location may be stored in association with the reference performance of the node in the storage device of the edge node 110.

Referring back to FIG. 2, at block 220, the edge node 110 determines performance indices associated with the one or more nodes based on the obtained locations and the performances of the one or more nodes and a SLO.

In some embodiments, the SLO may be set at the edge node 110 and may be associated with an application running on the node. The SLO may include, but is not limited to, minimum bandwidth, response time, round-trip latency, failure time, failure frequency, reliability, repair time, memory occupation, queue length, accuracy, integrity, and throughput. For example, in a case where an application running on the node generates network flow that is sensitive to latency, the SLO may be set to a round-trip latency. Similarly, in a case where an application is not sensitive to latency, but the resulting network flow needs to occupy a large bandwidth, the SLO may be set to a minimum bandwidth. In some embodiments, the SLO may be a value or number or a multi-dimensional vector. In other embodiments, the SLO may also take any other suitable form, and the scope of the present disclosure is not limited in this respect.

In some embodiments, a performance index may indicate a difference between a performance of a respective node and the SLO, so that the difference may be used to assess whether the node meets network requirements to a packet. Therefore, one or more of the nodes may be selected as nodes in a path from the edge node 110 to the destination node 130 according to the performance indices of the nodes. According to embodiments of the present disclosure, the performance index associated with a node may be determined in any suitable manner, whether currently known or will be developed in the future. Moreover, the performance index may have any suitable form of characterization.

Then, at block 230, the edge node 110 determines, based on the locations of the one or more nodes and the performance indices, a target path for delivering the packet from the edge node to the destination node. In some embodiments, a learning model based on a reinforcement learning algorithm may be used to determine the target path, which will be discussed in detail later.

According to embodiments of the present disclosure, for different network requirements and SLOs of applications running at a node, a path closest to the SLO may be determined and selected for routing the packet. In this way, not only the edge node is enabled to have an application awareness capability and decision-making suitable for path optimization, but also a dynamic configuration of the network and decentralization may be realized.

Figure 4:
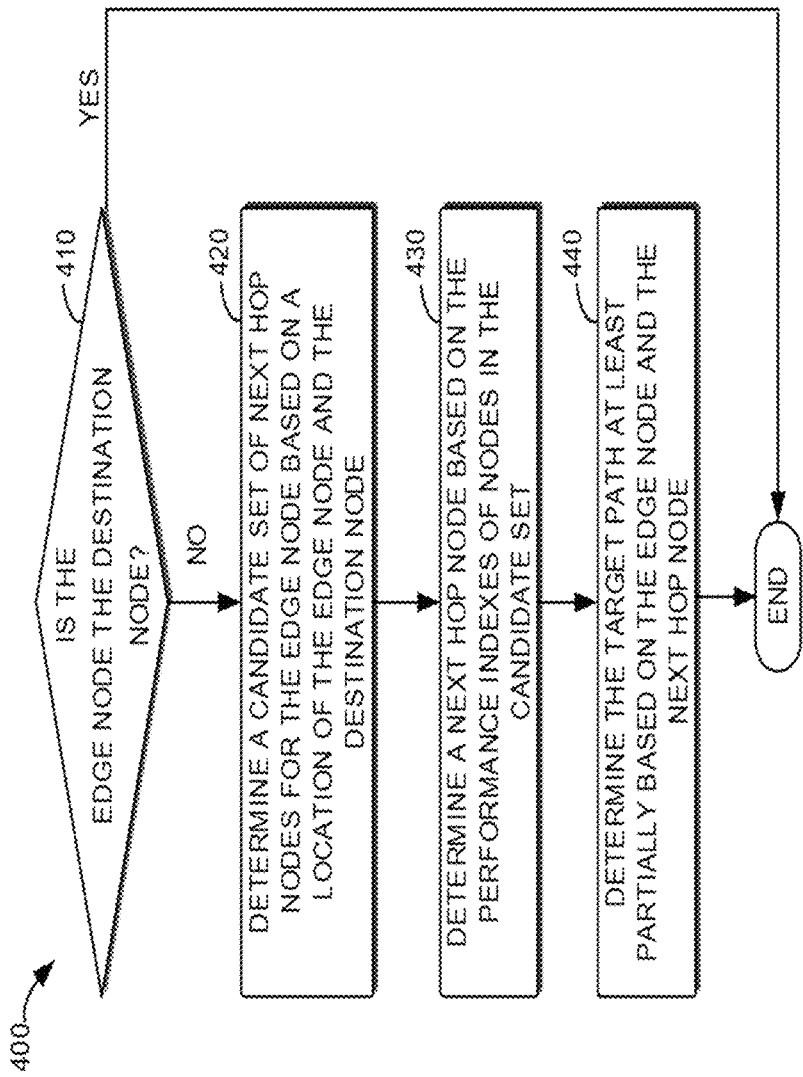
FIG. 4 shows a flow chart of a method for path optimization in accordance with an embodiment of the present disclosure.

FIG. 4 illustrates a flow diagram of an example method 400 for path optimization in accordance with an embodiment of the present disclosure. The method 400 may be regarded as an implementation of the step described in block 230 of FIG. 2, and this implementation is exemplary without limiting the scope of the present disclosure. As shown in FIG. 4, at block 410, the edge node 110 determines whether it is the destination node 130. If not, the flow proceeds to block 420, otherwise the method 400 ends.

At block 420, the edge node 110 determines a candidate set of next hop nodes for the edge node 110 based on a location of the edge node and a location of the destination node. For example, in the network 100 shown in FIG. 1, the candidate set of next hop nodes includes nodes 120-1 and 120-2.

At block 430, the edge node 110 determines a next hop node based on performance indices of the nodes in the candidate set. As an example, assuming that the SLO is set in a way that a latency ≤15 milliseconds (ms), the latency of the node 120-1 obtained by the edge node 110 based on the probe packet is 18 ms, and the latency of the node 120-2 is 13 ms. As a result, the edge node 110 will determine the node 120-2 as the next hop node.

At block 440, the edge node 110 determines a target path at least partly based on the edge node and the next hop node. For example, in the above example, the edge node 110 determines that the target path is the path 103 as shown in FIG. 1 at least partly based on the edge node 110 and next hop node 120-2.

In some embodiments, an example embodiment of the step described in block 440 includes: determining, by the edge node 110, whether the next hop node is a destination node; and in response to the next hop node being a destination node, determining a path from the edge node to the destination node as the target path.

In some embodiments, after the target path is determined, the edge node 110 causes the packet to be routed from the edge node to the destination node based on the target path. For example, the edge node 110 causes network flow generated by an application running thereon to be routed from the edge node 110 to destination node 130 based on the path 103.

In some embodiments, after the packet reaches the destination node, the edge node 110 obtains performance indices of the nodes in the target path. Then, the edge node 110 may generate performance indices associated with the target path based on performance indices of the nodes in the target path, to evaluate whether the entire target path meets SLO and network requirements. According to an embodiment of the present disclosure, the performance indices associated with the target path may be determined in any suitable manner, whether currently known or will be developed in the future. Moreover, the performance indices associated with the target path may have any suitable form of characterization. For example, a weighted average value for the performance indices of all of the nodes in the target path may be generated as a performance index of the entire path. The scope of the disclosure is not limited in this respect.

In this way, each node in the determined target path is selected with a goal of being as close as possible to the SLO and meeting the network requirements as much as possible. In addition, according to an embodiment of the present disclosure, a SLO-oriented and more flexible and comprehensive routing strategy is achieved by not only using the performance indices associated with the nodes to evaluate the quality of the nodes, but also using the performance indices associated with the path to evaluate the quality of the entire path.

Figure 5:
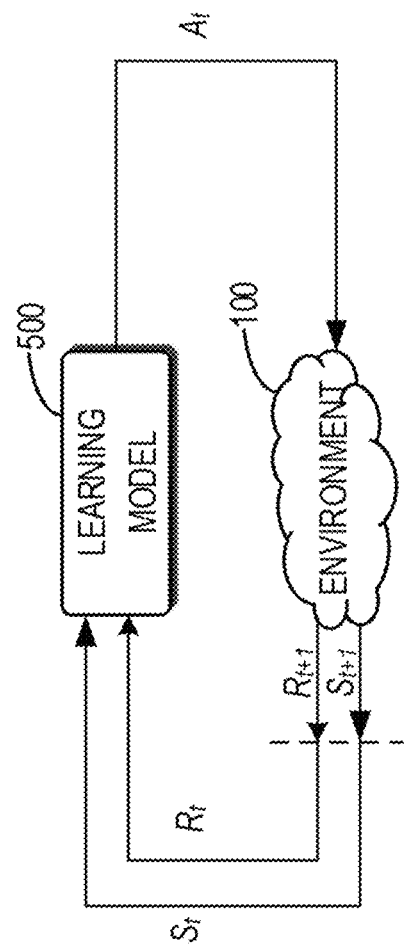
FIG. 5 shows a schematic diagram of a learning model for path optimization in accordance with an embodiment of the present disclosure.

FIG. 5 shows a schematic diagram of a learning model 500 for path optimization in accordance with an embodiment of the present disclosure. The learning model 500 may be implemented at the edge node 110 to perform steps stated in the blocks 220-230 as shown in FIG. 2, the blocks 310-330 as shown in FIG. 3, and the blocks 410-440 as shown in FIG. The path optimization problem may be converted to a reinforcement learning problem by means of the learning model 500 as shown in FIG. 5. As such, the determined target path may be a result of the learning model 500 performing the reinforcement learning process based on a reinforcement learning algorithm and finally converging. Description will be presented below in conjunction with Table 1.

TABLE 1

Reinforcement learning process of the learning model 500

| | |
|---|---|
| Environment | network 100, including nodes 120-1 through 120-5 and 130 |
| Service Level Objective (SLO) | minimum bandwidth, response time, round-trip latency, failure time, failure frequency, reliability, repair time, memory occupation, queue length, accuracy, integrity, throughput . . . |
| State S | locations and performance of nodes 120-1 through 120-5 and 130 |
| Action A | 1) select a next hop node and send a packet to the next hop node (the incoming node is excluded); 2) on longer continue to send |
| Reward function $R_s^a$ | $= \begin{cases} 0 & \text{if } P_{ss'}^a = \text{termination} \\ -1 & \text{otherwise} \end{cases}$ (shortest path routing strategy) $= -\frac{1}{2}\lvert \text{TargetPerf}_s - \text{ActualPerf}_s \rvert^2$ (SLO-based strategy) |

As shown in Table 1, the environment represents a scenario in which the learning model 500 performs an action. In an example embodiment of the present disclosure, the environment may be the network 100. The state S represents returning the current state of the learning model 500 from the environment, for example, the locations and performance of nodes 120-1 through 120-5 and 130 in the network 100. At represents a decision made by the learning model 500 based on the reinforcement learning algorithm, for example, the edge node 110 delivers a packet to the next hop node in the path based on the target path determined by the learning model 500. The reward R represents an instant return value of the environment to the learning model 500 and is used to evaluate the last action performed by the learning model 500. In an example embodiment of the present disclosure, the reward R may be a performance index associated with the node and generated based on the reward function $R_s^a$. It should be understood that the various deployments, functions, parameters, and decisions shown in Table 1 are merely exemplary and not limiting.

As an example, at an initial time t, the learning model 500 may obtain an initial location and an initial performance of the node, i.e., a state St, from the network 100, and the state St serves as an input to the learning model 500. The learning model 500 generates the reward Rt based on the state St and by utilizing the reward function $R_s^a$, i.e., the performance index associated with the node. Then, the learning model 500 may determine the target path from the edge node to the destination node at least partly based on the state St and the reward Rt, and perform the action At. The action At may be, for example, delivering a packet to the next hop node. It should be understood that different rewards Rt may be generated using different reward functions $R_s^a$. By way of example only, Table 1 illustrates reward functions for shortest path routing strategy and SLO-based routing strategy, respectively, although any suitable reward functions may be used in other example embodiments of the present disclosure. The scope of the disclosure is not limited in this respect.

The state S of the environment will change due to an execution of the action At. For example, at the next time t+1, the state changes from St to St+1. Accordingly, the reward also changes from Rt to Rt+1. Further, the state St+1 and the reward Rt+1 act as inputs to the learning model 500, and the learning model 500 may determine a transfer function P (St, At, St+1) based on the states St and St+1 and the action At, and determine a to-be-executed next action At+1 based on the transfer function P.

During a routing of a packet in a network environment, the learning model 500 will constantly repeat the above-mentioned reinforcement learning process and perform iterative calculations based on the reinforcement learning algorithm. Thus, an optimal solution or a local optimal solution obtained by the learning model 500 through convergence can be used as the target path from the edge node to the destination node.

According to an embodiment of the present disclosure, the learning model 500 may be built based on any suitable reinforcement learning algorithm, whether currently known or will be developed in the future. The scope of the disclosure is not limited in this respect.

FIG. 6 shows a schematic diagram of a verification test of a learning model 500 for path optimization in accordance with an embodiment of the present disclosure. As shown in FIG. 6, a topology of a network has 100 nodes, and 500 links are deployed among the 100 nodes, wherein the edge node on which the learning model 500 is deployed is the node 100, and the destination node is the node 199. In the example shown in FIG. 6, the SLO is set to a value of 30.1, and it can be seen that the learning model 500 eventually converges to obtain a target path including nodes 100, 152, 144, 172, 173, 129, 123, 133, 180, and 199.

It should be noted that embodiments of the present disclosure are also applicable to different networks and SLOs than those shown in FIG. 6, and that more or fewer nodes and links may be incorporated into the network. Moreover, embodiments of the present disclosure may use a learning model different than the one illustrated in FIG. 6. The scope of the disclosure is not limited in this respect.

An example implementation of a method in accordance with the present disclosure has been described in detail above with reference to FIGS. 1 through 6, and an implementation of the corresponding device will be described hereinafter.

Figure 7:
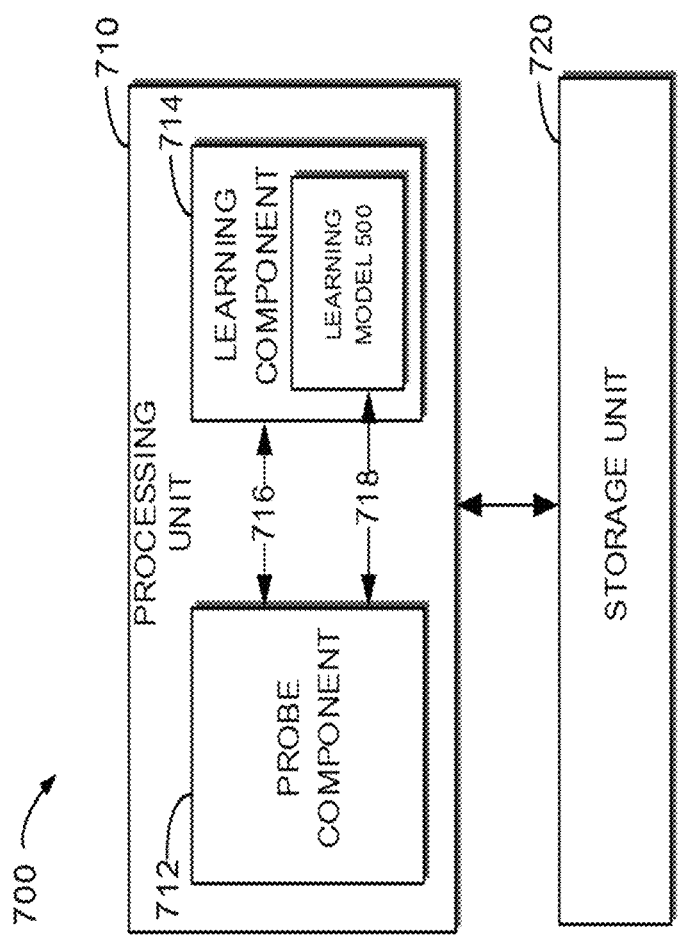
FIG. 7 shows a block diagram of an electronic device in accordance with an embodiment of the present disclosure.

FIG. 7 shows a block diagram of an electronic device 700 in accordance with an embodiment of the present disclosure. The electronic device 700 as shown in FIG. 7 may be implemented at any end node in a network interconnect architecture, for example, the edge node 110 shown in FIG. 1. The electronic device 700 may include a processing unit 710 and a storage unit 720.

The processing unit 710 may be, for example, any host, physical computer, virtual machine or server running an application. The processing unit 710 may send an input/output (I/O) request to the storage unit 720, for example for reading data from the storage unit 720 and/or write data to the storage unit 720. In response to receiving the read request from the processing unit 710, the storage unit 720 reads data and returns the read data to the processing unit 710. In response to receiving a write request from the processing unit 710, the storage unit 720 may write data. The storage unit 720 may be any currently known or future-developed non-volatile storage medium such as a magnetic disk, a solid state disk (SSD), or a disk array.

In some embodiments, the processing unit 710 may include a probe component 712 and a learning component 714. It should be noted that the probe component 712 may also be independent from the processing unit 710 and serve as a separate component. Moreover, the processing unit 710 may also include other additional components not shown. The scope of the disclosure is not limited in this respect.

The probe component 712 may further include a probe packet generator configured to generate a probe packet to probe the network and collect locations and real-time performance of nodes in the network.

The probe component 712 may send the probe packet to nodes in the network and receive, from the nodes, a response message for the probe packet, as described in blocks 310-320 of FIG. 3. In some embodiments, the probe component 712 may send the probe packet based on a tunneling protocol, an internet control message protocol (ICMP), or a customized remote sensing protocol.

The probe component 712 obtains the locations and performance of the nodes based on the response message, as depicted by block 210 in FIG. 2 and block 330 in FIG. 3.

In some embodiments, the probe component 712 interacts with the learning component 714 through an environment change application programming interface (API) 716 of the electronic device 700 to provide the obtained locations and performance to the learning component 714.

The learning component 714 may include a learning model, such as the learning model 500 shown in FIG. 5. The learning component 714 may be configured to train the learning model 500 using a reinforcement learning algorithm.

In some embodiments, the learning component 714 may determine performance indices associated with nodes in the network based on a SLO at the node 110 and the locations and performance of the nodes obtained from the probe component 712, as described in block 220 in FIG. 2.

In some embodiments, the learning component 714 may be further configured to determine a target path for delivering a packet from the edge node to the destination node based on the locations and performance indices of the nodes, as stated block 230 in FIG. 2 and blocks 410-440 in FIG. 4. As an example, based on the determined target path, the edge node 110 may use a source routing strategy to route a network flow generated by an application running at the edge node 110 within the network environment.

In some embodiments, the processing unit 710 is further configured to route the packet from the edge node 110 to the destination node 130 based on the target path determined by the learning component 714.

In some embodiments, the learning component 714 is further configured to obtain the performance indices of the nodes in the target path after the packet reaches the destination node 130, and generate the performance index associated with the target path based on performance indices of the nodes in the target path.

In some embodiments, the learning model 500 of the learning component 714 may interact with a reinforcement learning algorithm through a reinforcement learning API 718 to perform a reinforcement learning process.

In some embodiments, the storage unit 720 may be configured to store the locations and performance of nodes obtained by the probe component 714, reference locations and reference performance of the nodes, the performance indices associated with the nodes and the performance index associated with the target path as determined by the learning component 714.

According to an embodiment of the present disclosure, the environment change API 716 and the reinforcement learning API 718 may be standard APIs adapted to interact with any suitable software or hardware. In some embodiments, the reinforcement learning API may include, but is not limited to, functions such as env.reset( ), env.step(action), env.change_time( ), and the like. In some embodiments, the environment change API may include, but is not limited to, functions such as env.add_node( ), env.update_link( ), and the like. However, it should be understood that the above APIs are merely examples, and the electronic device 700 may also include any other suitable standard API. The scope of the disclosure is not limited in this respect.

According to an embodiment of the present disclosure, an electronic device for path optimization is provided, the electronic device optimizes, with a reinforcement learning process, a path for routing the packet, and may formulate a routing strategy for an end-to-end SLO. In this way, the edge node side may also have a decision-making right for path optimization, and satisfy requirements of many applications running at the edge node and the network flow generated by them, for different SLOs and network performance. In addition, since the electronic device according to an embodiment of the present disclosure provides a set of standard APIs, the electronic device may interact with any suitable reinforcement learning algorithm and learning model, thereby achieving flexible and efficient path optimization.

Figure 8:
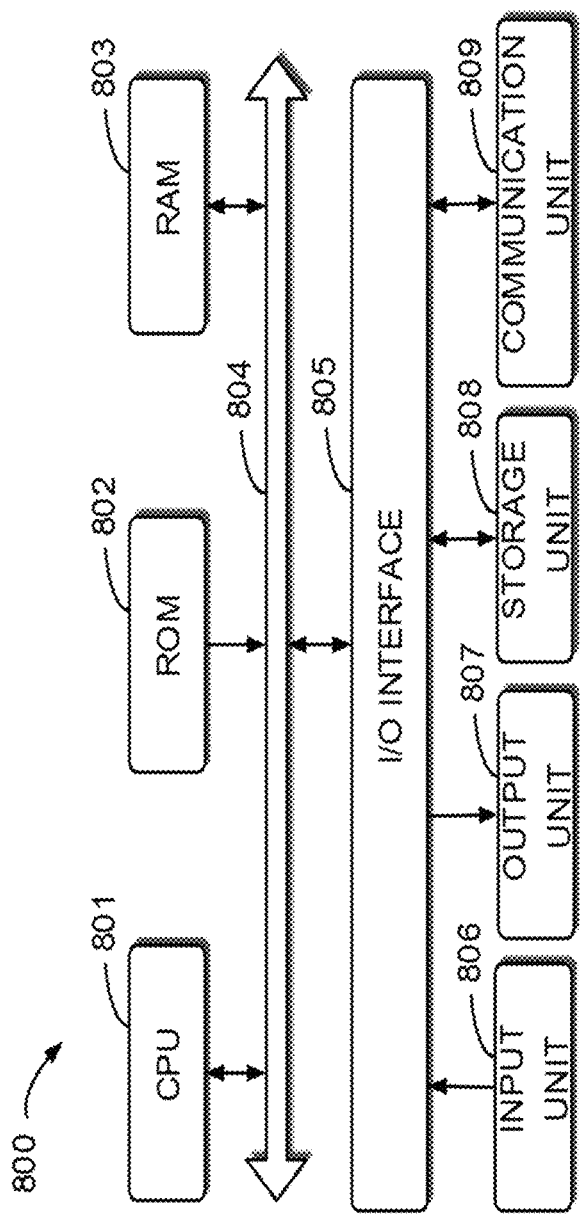
FIG. 8 shows a schematic block diagram of an example device that can be used to implement embodiments of the present disclosure; In the figures, the same or corresponding reference numerals indicate the same or corresponding parts.

FIG. 8 illustrates a schematic block diagram of an example device 800 that may be used to implement embodiments of the present disclosure. For example, the electronic device 700 shown in FIG. 7 may be implemented by the device 800. As shown in FIG. 8, the device 800 includes a central processing unit (CPU) 801 which is capable of performing various processes in accordance with computer program instructions stored in a read only memory (ROM) 802 or computer program instructions loaded from a storage unit 808 to a random access memory (RAM) 803. Various programs and data as required by operation of the device 800 are stored in the RAM 803. The CPU 801, the ROM 802 and the RAM 803 are connected to one another via a bus 804. An input/output (I/O) interface 805 is also connected to the bus 804.

The following components in the device 800 are connected to the I/O interface 805: an input unit 806 including a keyboard, a mouse, or the like; an output unit 807 such as various types of displays and speakers; the storage unit 808 such as a magnetic disk or optical disk; and a communication unit 809 such as a network card, a modem, a wireless communication transceiver or the like. The communication unit 809 allows the device 800 to exchange information/data with other devices via a computer network such as the Internet and/or various telecommunication networks.

The processing unit 801 performs various methods and processes described above, for example the methods 200, 300 and 400. For example, in some embodiments, the methods 200, 300 and 400 may be implemented as a computer software program, which is tangibly contained in a machine-readable medium, for example the storage unit 808. In some embodiments, part or all of the computer programs may be loaded and/or installed on the device 800 via the ROM 802 and/or communication unit 809. When the computer program is loaded in the RAM 803 and executed by CPU 801, one or more acts of the methods 200, 300 and 400 described above may be executed.

The present disclosure may be a method, an apparatus, a system and/or a computer program product. The computer program product may include a computer readable medium on which computer readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, special purpose computer, or other programmable data processing apparatus to produce a machine, such that the instructions, which execute via the processing unit of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations are realized without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for path optimization, comprising:
obtaining, at an edge node of a network including a plurality of nodes between the edge node and a destination node, locations and performances of one or more nodes from among the plurality of nodes in the network based on responses of the one or more nodes to at least one request from the edge node;
determining, by the edge node, performance indices associated with the one or more nodes based on the locations and the performances of the one or more nodes and a service level objective (SLO), a performance index indicating a difference between a performance of a respective node and the SLO; and
determining, by the edge node, based on the locations of the one or more nodes and the performance indices, a target path for delivering a packet from the edge node to the destination node.

2. The method of claim 1, wherein obtaining the locations and the performances of the one or more nodes comprises:
transmitting probe packets to the one or more nodes in the network;
receiving, from the one or more nodes, response messages for the probe packets; and
obtaining the locations and the performances of the one or more nodes based on the response messages.

3. The method of claim 2, further comprising at least one of the following:
in response to the obtained location of a respective node of the one or more nodes being different from a reference location of the respective node, updating the reference location with the obtained location; and
in response to the obtained performance of a respective node of the one or more nodes being different from a reference performance of the respective node, updating the reference performance with the obtained performance.

4. The method of claim 1, wherein determining the target path comprises:
determining whether the edge node is the destination node;
in response to the edge node not being the destination node, determining a candidate set of next hop nodes for the edge node based on a location of the edge node of the network and the destination node, determining a next hop node based on performance indices of nodes in the candidate set, and determining the target path at least partially based on the edge node and the next hop node.

5. The method of claim 4, wherein determining the target path at least partially based on the edge node and the next hop node comprises:

determining whether the next hop node is the destination node; and in response to the next hop node being the destination node, determining a path from the edge node to the destination node as the target path.

6. The method of claim 1, further comprising:

causing the packet to be routed from the edge node to the destination node based on the target path.

7. The method of claim 6, further comprising:

obtaining performance indices of nodes in the target path after the packet reaches the destination node; and generating a performance index associated with the target path based on the performance indices of the nodes in the target path.

8. The method of claim 1, wherein the SLO comprises at least one of: minimum bandwidth, response time, round-trip latency, failure time, failure frequency, reliability, repair time, memory occupation, queue length, accuracy, integrity and throughput.

9. The method of claim 1, wherein the destination node is set at the edge node.

10. An electronic device, comprising:

at least one processing unit;

at least one memory coupled to the at least one processing unit and storing instructions executable by the at least one processing unit, the instructions, when executed by the at least one processing unit, causing the device to perform acts comprising:

obtaining, at an edge node of a network including a plurality of nodes between the edge node and a destination node, locations and performances of one or more nodes from among the plurality of nodes in the network based on responses of the one or more nodes to at least one request from the edge node;

determining, by the edge node, performance indices associated with the one or more nodes based on the locations and the performances of the one or more nodes and a service level objective (SLO), a performance index indicating a difference between a performance of a respective node and the SLO; and determining, by the edge node, based on the locations of the one or more nodes and the performance indices, a target path for delivering a packet from the edge node to the destination node.

11. The device of claim 10, wherein obtaining the locations and the performances of the one or more nodes comprises:

transmitting probe packets to the one or more nodes in the network;

receiving, from the one or more nodes, response messages for the probe packets; and obtaining the locations and the performances of the one or more nodes based on the response messages.

12. The device of claim 11, further comprising at least one of the following:

in response to the obtained location of a respective node of the one or more nodes being different from a reference location of the respective node, updating the reference location with the obtained location; and in response to the obtained performance of a respective node of the one or more nodes being different from a reference performance of the respective node, updating the reference performance with the obtained performance.

13. The device of claim 10, wherein determining the target path comprises:

determining whether the edge node is the destination node;

in response to the edge node not being the destination node, determining a candidate set of next hop nodes for the edge node based on a location of the edge node of the network and the destination node, determining a next hop node based on performance indices of nodes in the candidate set, and determining the target path at least partially based on the edge node and the next hop node.

14. The device of claim 13, wherein determining the target path at least partially based on the edge node and the next hop node comprises:

determining whether the next hop node is the destination node; and in response to the next hop node being the destination node, determining a path from the edge node to the destination node as the target path.

15. The device of claim 10, further comprising:

causing the packet to be routed from the edge node to the destination node based on the target path.

16. The device of claim 15, further comprising:

obtaining performance indices of nodes in the target path after the packet reaches the destination node; and generating a performance index associated with the target path based on the performance indices of the nodes in the target path.

17. The device of claim 10, wherein the SLO comprises at least one of: minimum bandwidth, response time, round-trip latency, failure time, failure frequency, reliability, repair time, memory occupation, queue length, accuracy, integrity and throughput.

18. The device of claim 10, wherein the destination node is set at the edge node.

19. A computer program product that is tangibly stored in a non-transitory computer storage medium and comprises machine-executable instructions which, when executed by a device, causing the device to perform steps of:

obtaining, at an edge node of a network including a plurality of nodes between the edge node and a destination node, locations and performances of one or more nodes from among the plurality of nodes in the network based on responses of the one or more nodes to at least one request from the edge node;

determining, by the edge node, performance indices associated with the one or more nodes based on the locations and the performances of the one or more nodes and a service level objective (SLO), a performance index indicating a difference between a performance of a respective node and the SLO; and determining, by the edge node, based on the locations of the one or more nodes and the performance indices, a target path for delivering a packet from the edge node to the destination node.

20. The computer program product of claim 19, wherein obtaining the locations and the performances of the one or more nodes comprises:

transmitting probe packets to the one or more nodes in the network;
receiving, from the one or more nodes, response messages for the probe packets; and
obtaining the locations and the performances of the one or more nodes based on the response messages.

* * * * *